United States Patent [19]

Hattori et al.

[11] Patent Number: 4,572,537
[45] Date of Patent: Feb. 25, 1986

[54] COUPLER FOR CONNECTING TRAILER TO TRACTOR

[75] Inventors: Takashi Hattori, Fukuoka; Tadao Otsuka, Nishinomiya, both of Japan

[73] Assignee: Hitachi Metals, Ltd., Japan

[21] Appl. No.: 652,655

[22] Filed: Sep. 20, 1984

[30] Foreign Application Priority Data

Sep. 21, 1983 [JP] Japan .................... 58-145103[U]

[51] Int. Cl.⁴ ............................................. B62D 53/08
[52] U.S. Cl. ...................................... 280/433; 403/37
[58] Field of Search ............... 280/433, 432, 434, 435, 280/436, 437, 438 R, 438 A, 439, 440, 441; 384/123, 320, 421; 410/64; 403/36, 37, 38, 39

[56] References Cited

U.S. PATENT DOCUMENTS

| | | | |
|---|---|---|---|
| 2,359,498 | 10/1944 | Walther et al. | 280/434 |
| 2,423,743 | 7/1947 | Walther et al. | 280/434 |
| 2,788,989 | 4/1957 | Davies | 280/434 |
| 2,977,137 | 3/1961 | Durham | 280/434 |
| 3,063,738 | 11/1962 | Becker | 280/434 |
| 3,539,202 | 11/1970 | Nelson | 280/434 |
| 3,633,941 | 1/1972 | Pleier | 280/440 |
| 3,759,546 | 9/1973 | Slaven | 280/434 |
| 3,830,523 | 8/1974 | Morichetto | 280/434 |
| 3,888,514 | 6/1975 | Klein | 280/434 |
| 4,140,328 | 2/1979 | Fontaine | 280/434 |
| 4,394,030 | 7/1983 | Inoue | 280/434 |
| 4,447,070 | 5/1984 | Inoue | 280/434 |
| 4,480,849 | 11/1984 | Yano et al. | 280/433 |

FOREIGN PATENT DOCUMENTS

| | | |
|---|---|---|
| 2508255 | 9/1976 | Fed. Rep. of Germany . |
| 2543115 | 3/1977 | Fed. Rep. of Germany . |
| 646631 | 10/1962 | Italy . |
| 123572 | 9/1980 | Japan . |
| 1407084 | 9/1975 | United Kingdom . |

Primary Examiner—Joseph F. Peters, Jr.
Assistant Examiner—Mitchell J. Hill
Attorney, Agent, or Firm—Finnegan, Henderson, Farabow, Garrett & Dunner

[57] ABSTRACT

A coupler for connecting a trailer to a tractor includes a main plate having a top surface and a bottom surface and formed with an oil groove on the top surface for a lubricant to flow therethrough, a pair of king pin locking jaws secured to the bottom surface of the main plate for pivotal movement in a horizontal plane to cooperate with each other to releasably hold a king pin therebetween, and a locking member located on the bottom surface of the main plate for sliding movement in which it is brought into and out of engagement with the jaws, to be inserted in a space defined by heads of the jaws when the king pin is held between the jaws to keep the jaws from pivotally moving. The locking member is formed with an oil sump located on a top surface thereof, and oil passages extending from the oil sump to an outer periphery of the locking member, and the main plate is formed with a through hole extending from a position in which it communicates with the oil groove on the top surface of the main plate to the oil sump on the top surface of the locking member.

2 Claims, 8 Drawing Figures

COUPLER FOR CONNECTING TRAILER TO TRACTOR

BACKGROUND OF THE INVENTION (1) Field of the Invention

This invention relates to couplers for connecting trailers to tractors, and more particularly it is concerned with a coupler suitable for connecting a trailer to a tractor in applications wherein frequent coupling and uncoupling operations need not be performed.

(2) Description of the Prior Art

With an increase in the volume of goods transported from place to place by meeting the requirements of the law of demand and supply and an increase in speed in the means of transportation handling the ever increasing volume of goods, the use of trailers each having a kind pin secured thereto for transporting these goods by means of tractors each having a coupler mounted thereto has become popular in recent years. Advances have been made in the progress of technology for increasing the safety of this means of transportation.

However, the technology developed so far aims at ensuring that the king pin is positively connected to the coupler, and it is left to the inspection carried out by the mechanics to check the parts to see if they are in good condition.

When the tractors and trailers are frequently coupled and uncoupled, it is possible to carry out inspection of various parts and supply lubricant satisfactorily. However, when a coupler of a tractor is connected to a king pin of a trailer and they remain coupled to each other over a prolonged period of time, it is impossible to carry out inspection and repair of the parts satisfactorily. Thus, difficulties would be experienced in detecting wear caused on sliding and engaging parts, thereby causing a reduction in safety and a shortening of the service life of the coupler.

Particularly, a coupler of the type which comprises a locking member inserted in a space defined between heads of a pair of jaws pivotably moved horizontally leftwardly and rightwardly, respectively, to lock the king pin so as to thereby prevent rotation of the locked jaws has suffered the disadvantage that difficulties are experienced in supplying grease or lubricant to the parts because the main parts are all located in the central portion of the underside of the main plate.

SUMMARY OF THE INVENTION

This invention has as its object the provision of a coupler connecting a trailer to a tractor enabling lubrication of parts located on the underside of the main plate to be automatically effected, thereby prolonging the service life of the coupler and increased safety.

According to the invention, there is provided a coupler for connecting a trailer to a tractor comprising a main plate including a top surface and a bottom surface and having an oil groove formed on the top surface to allow a lubricant to flow therethrough, a pair of king pin locking jaws secured to the bottom surface of the main plate for pivotal movement in a horizontal plane to cooperate with each other to releasably hold a king pin therebetween, and a locking member located on the bottom surface of the main plate for sliding movement in which it is brought into and out of engagement with the jaws, to be inserted in a space defined by heads of the jaws when the king pin is held between the jaws to keep the jaws from pivotally moving, the locking member including an oil sump located on a top surface thereof, and an oil passage extending from the oil sump to an outer periphery of the locking member, while the main plate including a through hole extending through the main plate from a position in which it communicates with the oil groove on the top surface of the main plate to the oil sump on the top surface of the locking member.

Additional and other objects, features and advantages of the invention will become apparent from the description set forth hereinafter when considered in conjunction with the accompanying drawings.

DETAILED DESCRIPTION OF THE PREFERRED EMBODIMENT

Figure 1:
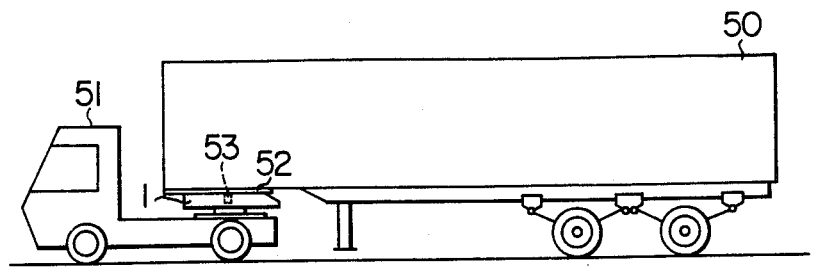
FIG. 1 is a side view of a tractor provided with the coupler according to the invention connected to a tractor.

FIG. 1 shows the coupler according to the invention being in use to connect a trailer 50 and a tractor 51 together. As shown, the coupler comprises a main plate 1 mounted to the tractor 51 in such a manner that an upper or top surface thereof faces upwardly. The trailer 50 has an upper plate 52 secured to its undersurface, and a king pin 53 extending downwardly from its undersurface. In FIG. 1 in which the tractor 51 and trailer 50 are coupled together, the top surface of the main plate 1 is maintained in contact with a lower or bottom surface of the upper plate 52 and the king pin 53 is inserted in a notch 13 (see FIG. 3) formed in the main plate 1 in such a manner that a lower end of the king pin 53 is received in a receiving hole 14 (see FIG. 2) to keep the king pin 53 in a locked position.

Figure 4:
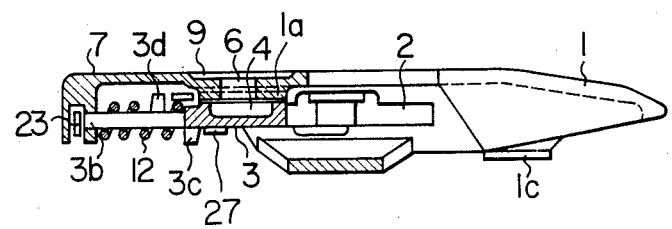
FIG. 4 is a view as seen in the direction of arrows IV—IV in FIG. 3.
Figure 5:
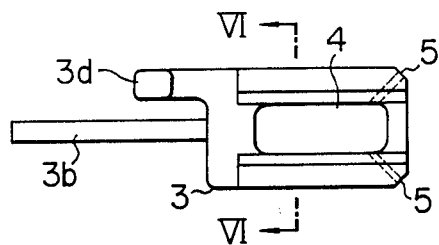
FIG. 5 is a top plan view of the locking member of the coupler shown in FIGS. 2 and 3.
Figure 6:
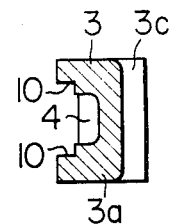
FIG. 6 is a view as seen in the direction of arrows VI—VI in FIG. 5.
Figure 7:
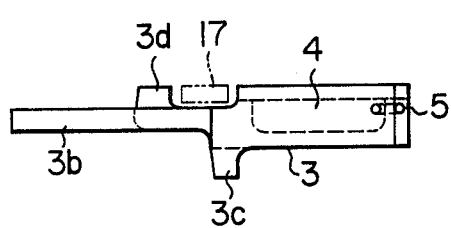
FIG. 7 is a side view of the locking member shown in FIGS. 5 and 6.
Figure 2:
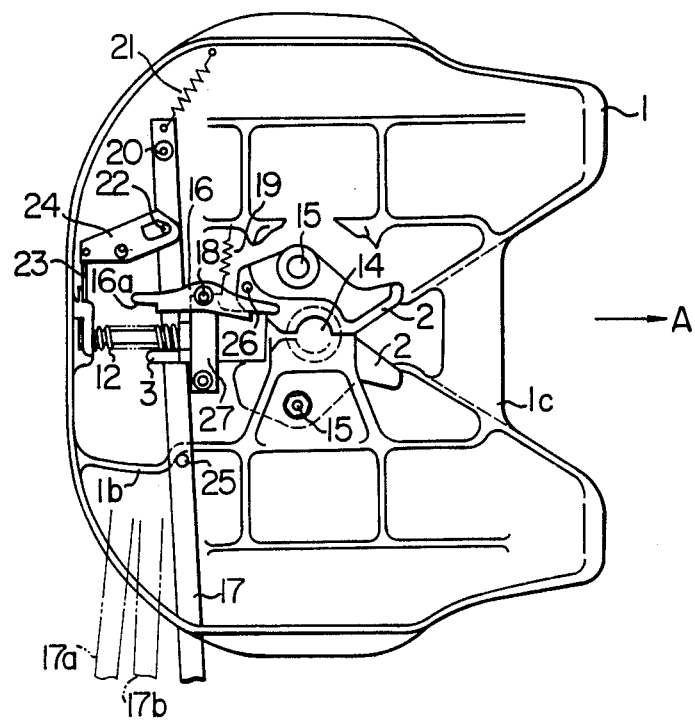
FIG. 2 is a bottom plan view of the coupler comprising one embodiment of the invention.

Referring to FIGS. 2 and 4, the main plate 1 has pivotally connected to a central portion of an undersurface or bottom surface thereof as indicated at 15 a pair of king pin locking jaws 2 for pivotal movement in a horizontal plane which define between them the king pin receiving hole 14. A locking member 3, a trip lever 16 and an operation lever 17 are located leftwardly of the jaws 2. As can be clearly seen in FIGS. 2, and 4-7, the locking member 3 includes a main body 3a, a pin 3b, a downwardly projecting portion 3c and an upwardly projecting portion 3d, and the main body 3a is formed at its top surface with an oil sump 4 in the form of a recess, and oil passages 5 extending from the oil sump 4 to a portion of an outer periphery of the locking member 3 to be inserted in a space defined by heads of the pair of jaws 2 (see FIG. 2) to engage same. The oil sump 4 is formed at opposite sides with shoulders 10 extending longitudinally of the locking member 3. As clearly seen in FIGS. 2 and 4, the locking member 3 is mounted in a predetermined position on the main plate 1 to move in sliding movement along a downwardly extending portion 1a of the main plate 1 leftwardly and rightwardly in FIGS. 2 and 4 as the shoulders 10 are brought into engagement with the downwardly extending portion 1a and the bottom surface of the locking member 3 is supported by a keep member 27 secured to the bottom surface of the main plate 1. The locking member 3 is urged to move rightwardly (FIGS. 2 and 4) by the biasing force of a spring 12 mounted about the pin 3b.

The tripper 16 is supported for pivotal movement in a horizontal direction about a pivot 18 and formed at its left end (FIG. 2) with a stepped portion 16a engageable with the downwardly extending portion 3c of the locking member 3. A spring 19 urges by its biasing force the trip lever 16 to move counterclockwise at all times. The operation lever 17 is supported by a pin 20 connected to an undersurface or bottom surface of the main plate 1 for movement in a longitudinal direction and pivotal movement in a horizontal direction, and urged to move upwardly in FIG. 2 by the biasing force of a spring 21 at all times. The lever 17 is so arranged as to be engageable with the upwardly projecting portion 3d of the locking member 3 to move the latter. The operation lever 17 has connected thereto a pin 22 loosely received in a slot formed at one end portion of an arm 24 having a stopper 23 connected to an opposite end portion. The operation lever 17 has another pin 25 connected thereto which is brought into engagement with a rib 1b on the bottom surface of the main plate 1. In FIGS. 2–4, 1c designates a reinforcing member located on the bottom surface of the main plate 1.

Figure 3:
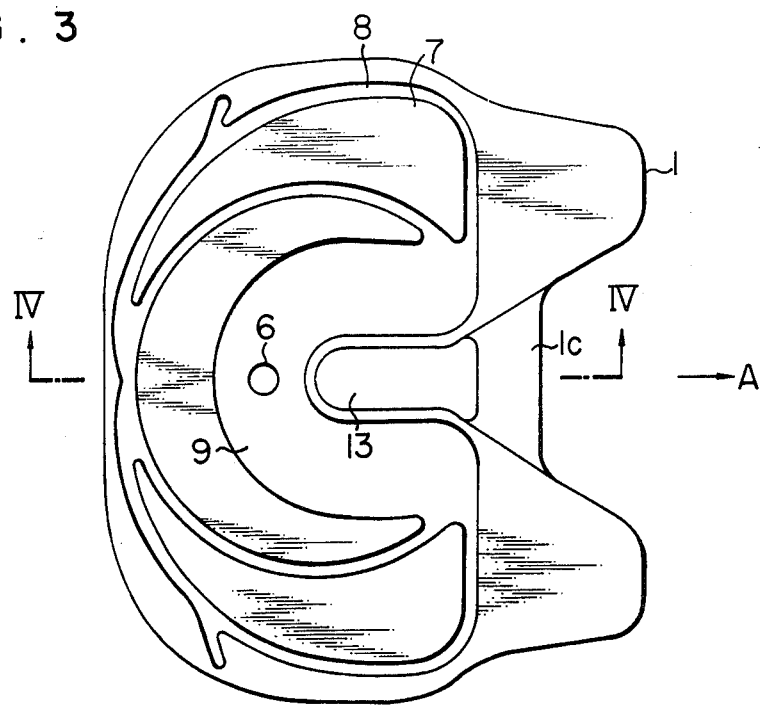
FIG. 3 is a top plan view of the coupler shown in FIG. 2.

Referring to FIGS. 3 and 4, an oil groove 8 is formed on the top surface of the main plate 1 which is brought into sliding contact with the bottom surface of the upper plate 52 (FIG. 1) to serve as a sliding surface 7 to allow lubricant to flow on the sliding surface 7. Formed in a central portion of the sliding surface 7 to avoid excess lubricant dripping along the outer periphery of the main plate 1 is a recess 9 communicating with the oil grooves 8 and formed with a through hole 6 which extends from the top face of the main plate 1 to the bottom surface thereof to cause the lubricant in the recess 9 to flow in drops down to the oil sump 4 of the locking member 3.

The embodiment of the coupler in conformity with the invention is constructed as described hereinabove. Operation of the coupler of the aforesaid construction will now be described.

FIG. 2 shows various parts of the coupler in positions in which they are located when the trailer 50 is connected to the tractor 51 or when the king pin 53 (FIG. 1) is inserted in the receiving hole 14 and the locking member 3 is inserted in the space between the heads of the pair of king pin locking jaws 2 to prevent the jaws 2 from moving in pivotal movement to lock the king pin 53 by the jaws 2. As the operation lever 17 is moved downwardly in FIG. 2 when the parts of the coupler are in the aforesaid positions, the arm 24 pivotally moves clockwise about the support portion and causes the stopper 23 to move upwardly in FIG. 2 to be brought out of engagement with a left end of the pin 3b, thereby allowing the main body 3a of the locking member 3 to move leftwardly. As the operation lever 17 is moved in pivotal movement about the pin 20, the operation lever 17 is brought into engagement with the upwardly projecting portion 3d of the locking member 3 (FIG. 4), to cause the locking member 3 to move leftwardly. Thus, the locking member 3 is withdrawn from the space between the heads of the pair of king pin locking jaws 2, thereby allowing the jaws 2 to move freely in pivotal movement. As the locking member 3 moves leftwardly a distance corresponding to the pivotal movement of the operation lever 17 to a position indicated by 17a, the downwardly projecting portion 3c of the locking member 3 is brought into engagement with the stepped portion 16a of the trip lever 16, thereby preventing further movement of the locking member 3. If the tractor 51 (FIG. 1) is moved forwardly at this time, the coupler mounted to the tractor 51 moves leftwardly in FIG. 2, so that the king pin 53 is withdrawn in the direction of an arrow A from the receiving hole 14 with respect to the coupler, as shown in FIGS. 2 and 3. Thus, the tractor 51 is uncoupled from the trailer 50.

Figure 8:
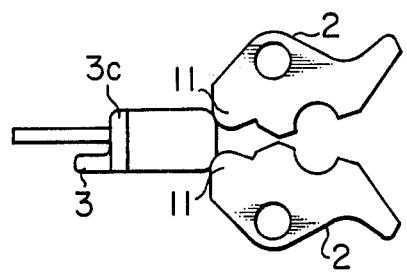
FIG. 8 is a bottom plan view of the coupler shown in FIG. 2, showing the locking member in engagement with the heads of a pair of king pin locking jaws.

When the king pin 53 is withdrawn from the receiving hole 14 as described hereinabove, the king pin locking jaws 2 located in superposed relation in upper and lower portions of FIG. 2 move counterclockwise and clockwise, respectively, in pivotal movement to bring a pin 26 on the upper jaw 2 into engagement with the trip lever 16 to move same clockwise about the pivot 18, to thereby release the stepped portion 16a of the trip lever 16 from engagement with the downwardly projecting portion 3c of the locking member 3. This allows the locking member 3 to move in sliding movement rightwardly in FIG. 2 by virtue of the biasing force of the spring 12 to a position shown in FIG. 8 in which it is positioned against the heads 11 of the jaws 2. As a result, the operation lever 17 is returned to a position indicated by 17b. If the tractor 51 is moved toward the trailer 50 when the locking member 3 is positioned against the heads 11 of the jaws 2 as shown in FIG. 8, then the king pin 53 is moved in a direction opposite the direction A with respect to the coupler and returned to the position shown in FIG. 2 in which the king pin 53 is received in the receiving hole 14 and the locking member 3 is inserted by the biasing force of the spring 12 in the space defined between the pair of jaws 2. When the king pin 53 and coupler are in the condition shown in FIG. 2, the jaws 2 are locked by the locking member 3 and prevented from moving in pivotal movement, and the king pin 53 is also locked in the receiving hole 14 and prevented from escaping therefrom.

In the embodiment of the coupler constructed in conformity with the invention as described hereinabove, the trailer and tractor can be freely connected and disconnected. However, when the trailer 50 is coupled to the tractor 51 and the tractor 51 is set in motion, the lubricant collected in the oil sump 4 of the locking member 3 from the oil groove 8 on the top surface of the main plate 1 through the recess 9 and through hole 6 is splashed and agitated by the force of inertia as the tractor 51 starts, stops and turns and by the force of vibration when the tractor 51 and trailer 50 are travelling, with a result that the lubricant in the oil sump 4 flows out to sliding surfaces of the locking member 3 and main plate 1 between the shoulders 10 of the locking member 3 and the lower projecting portion 1a of the main plate 1 and forms films of lubricant therebetween. This is conducive to smooth lubrication of the sliding surfaces between the locking member 3 and main plate 1. Also, when the tractor 51 starts or stops or when the locking member 3 is brought into abutting engagement with the heads 11 of the king pin locking jaws 2 as shown in FIG. 8, the force of inertia is exerted on the lubricant in the oil sump 4 of the locking member 3 and urges the lubricant to flow from the oil sump 4 through the oil passages 5 to the outer pierphery of the locking member 3, particularly to the portion of the outer periphery which is inserted in the space between the heads 11 of the pair of jaws 2 and brought into engagement with the jaws 2, to form films of lubricant between the locking member 3 and jaws 2. This is conducive to smooth lubrication of the surfaces of the locking member 3 and the pair of jaws 2 in engagement with each other.

In the embodiment shown and described hereinabove, the oil passages 5 are formed by providing the locking member 3 with through holes. However, the invention is not limited to this form of oil passages 5 and a groove may be formed around the top surface of walls defining the oil sump 4 to serve as an oil passage.

From the foregoing description, it will be appreciated that in the coupler according to the invention, lubrication of the parts located on the bottom surface of the main plate, particularly the surfaces of the locking member and the main plate which would be brought into sliding contact with each other and the surfaces of the locking member and the pair of jaws which would be brought into engagement with each other, can be effected automatically. This avoids wear that might otherwise be caused on the locking member and the pair of king pin locking jaws which are the principal parts of the coupler, thereby prolonging the service life of the coupler and increasing the safety with which the trailer can be coupled to the tractor.

What is claimed is:

1. A coupler for connecting a trailer to a tractor comprising:
    a main plate including a top surface and a bottom surface and having an oil groove formed on the top surface to allow a lubricant to flow therethrough;
    a pair of king pin locking jaws secured to the bottom surface of the main plate for pivotal movement in a horizontal plane to cooperate with each other to releasably hold a king pin therebetween; and
    a locking member located on the bottom surface of the main plate for sliding movement in which it is brought into and out of engagement with the jaws, to be inserted in a space defined by heads of the jaws when the king pin is held between the jaws to keep the jaws from pivotally moving;
    the locking member including an oil sump located on a top surface thereof, and an oil passage extending from the oil sump to an outer periphery of the locking member, while the main plate including a trough hole extending through the main plate from a position in which it communicates with the oil groove on the top surface of the main plate to the oil sump on the top surface of the locking member.

2. A coupler as claimed in claim 1, wherein the main plate further includes a recess for containing lubricant located in a substantially central portion of the upper surface of the main plate and communicating with the oil groove, said through hole extending from the position in which said recess is located to said oil sump.

* * * * *